United States Patent [19]
Simazaki et al.

[11] 3,729,264
[45] Apr. 24, 1973

[54] ANALYZER USING THE ROTOR OF A MOTOR AS A LIGHT CHOPPER

[75] Inventors: Tosio Simazaki; Haruo Kotani; Kozo Isida, all of Minami-ku, Kyoto-shi, Kyoto-fu, Japan

[73] Assignee: Horiba Ltd., Kyoto-fu, Japan

[22] Filed: Aug. 9, 1971

[21] Appl. No.: 170,097

[52] U.S. Cl............356/206, 250/43.5 R, 250/233, 350/274, 356/51

[51] Int. Cl..........G01n 21/22, G01d 5/36, G02f 1/30

[58] Field of Search.................356/51, 88, 93, 96, 356/97, 207, 208, 204, 205, 206; 350/266, 272, 273, 274, 275; 250/43.5 R, 83.3 H, 233

[56] References Cited

UNITED STATES PATENTS

| | | | |
|---|---|---|---|
| 2,698,390 | 12/1954 | Liston | 250/43.5 R |
| 2,933,600 | 4/1960 | Spracklen et al. | 250/43.5 R |

Primary Examiner—Ronald L. Wibert
Assistant Examiner—V. P. McGraw
Attorney—Hall & Houghton

[57] ABSTRACT

A double light path analyzer has a light intermitter section installed between a cell section and a light source section; the intermitter section provides the magnetic rotor of a slow speed motor with vane defining aperture means and associates it to act also as the light intermitting means; and separate light sources for the two paths are adjustable axially thereof by externally operable and lockable means.

4 Claims, 13 Drawing Figures

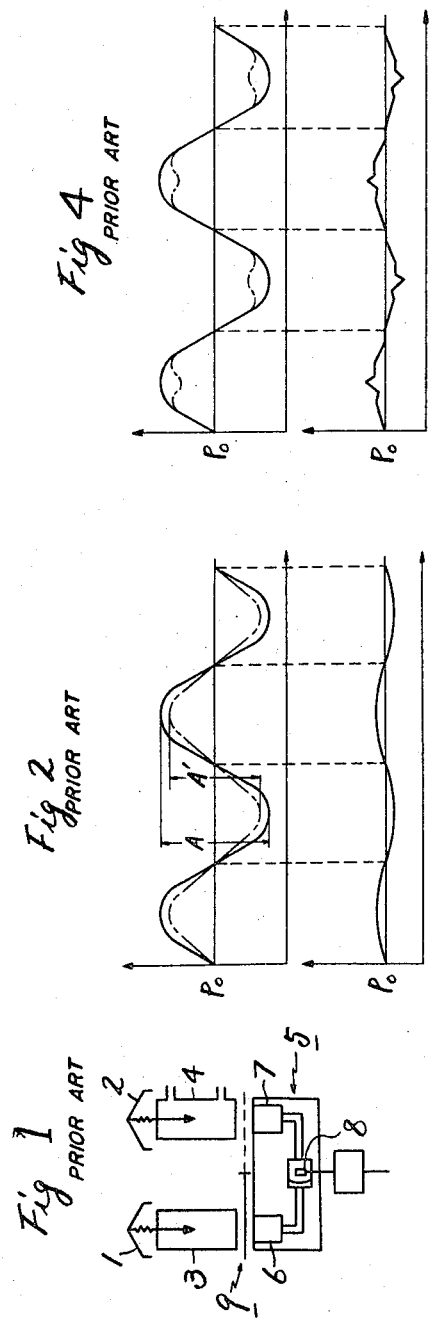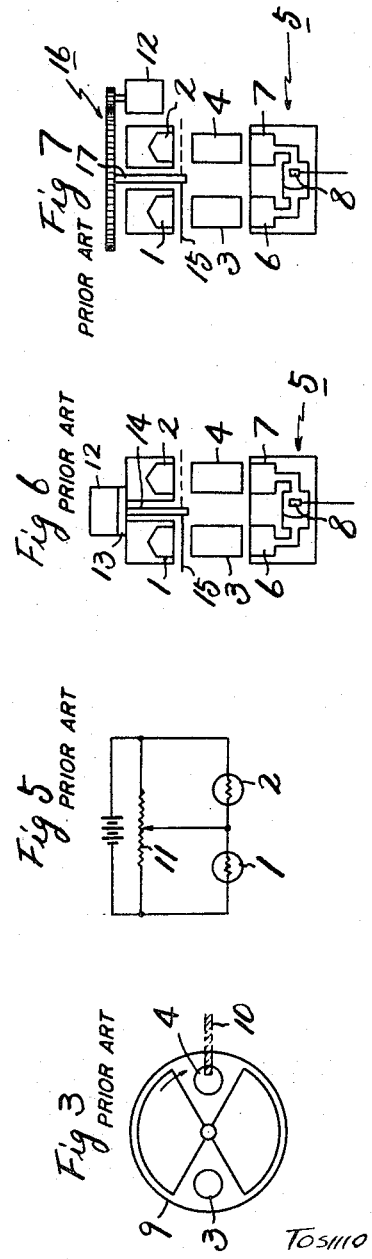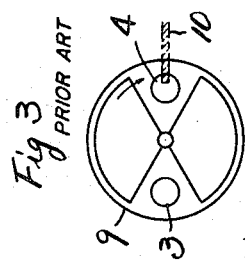

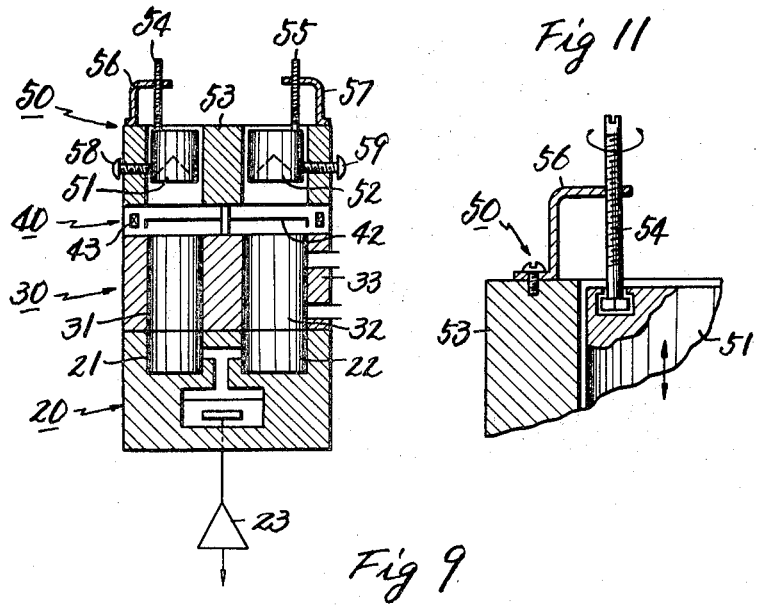
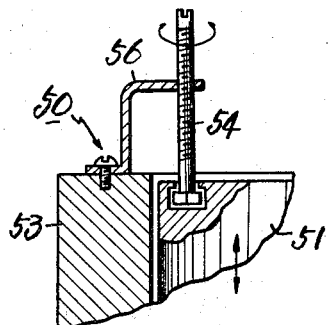
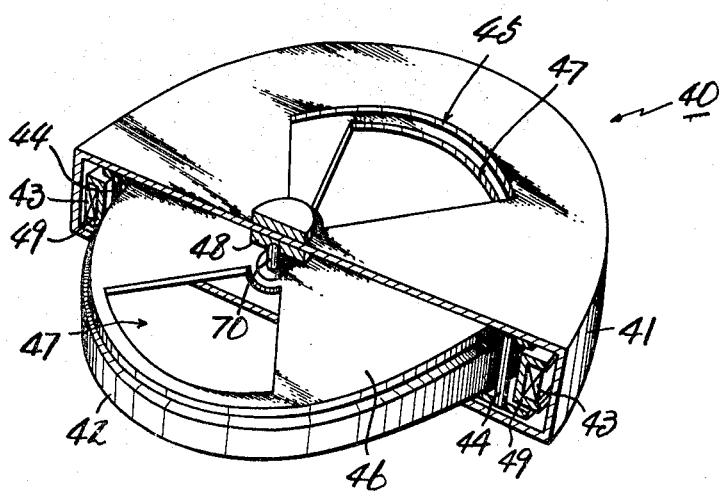
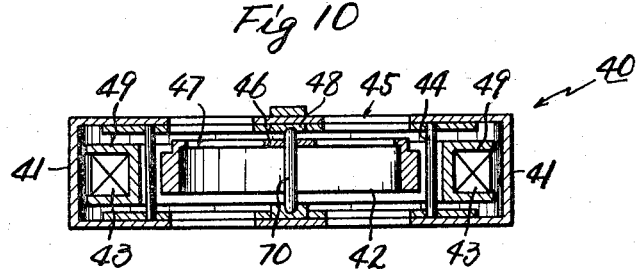

Patented April 24, 1973

TOSHIO SHIMAZAKI,
HARUO KOTANI,
KOZO ISHIDA,

INVENTORS

BY *Hall & Houghton*
Attorney

ANALYZER USING THE ROTOR OF A MOTOR AS A LIGHT CHOPPER

BACKGROUND OF THE INVENTION

1. Field of the Invention

The present invention relates to an optical apparatus for use in micro-light-displacement measuring instruments or micro-light-transmittance measuring instruments, constituted by optical system, e.g., colorimeters, gas concentration meters, smoke meters, turbidity meters and spectrophotometers.

2. Description of the Prior Art

Generally, the double light-path type infrared analyzer, as shown in FIG. 1, is so arranged that the difference between infrared energies emitted from light-sources 1 and 2 and passed through a reference cell 3 and a sample cell 4, respectively, is selectively absorbed by a detector 5 and said energy difference is derived as a difference between the pressures in the chambers 6 and 7 of the detector 5, which pressure difference is converted into an electric signal by a capacitor microphone 8 to detect the sample gas concentration.

In this case, in order to facilitate the conversion into electric signals at the detector 5, a light-intermitter 9 is used to intermittently interrupt the right and left light-paths with a given period to provide an a.c. waveform. Pressure response characteristics of the chambers 6 and 7 of an ideal capacitor microphone type detector would be as shown in FIG. 2.

Now, even if zero gas flows through the sample cell, since there is a slight difference in quality between the manufactured right and left light-sources there will be a difference between the emitted infrared energies, so that the respective energy quantities which reach the detector are not necessarily equal to each other, thus producing an unbalance signal. Therefore, it is necessary to preregulate the right and left infrared energy quantities (light-quantities) so that the amplitudes of the pressure waveforms in the right and left chambers may have the same value and hence no unbalance signal may be produced.

Heretofore, as shown in FIG. 3, the regulation of said light-quantities has been effected by using a light-interrupting plate 10 to put a physical shadow in the light-path. When a physical shadow is put in the light-path, since the light-path is always intermittently interrupted by the light-interrupting plate 9, part of the waveform on the side where the light-interrupting plate is inserted becomes deformed, as shown in FIG. 4, so that the resultant waveform is not a perfect a.c. waveform but it is in the form of harmonic waves superimposed on an a.c. waveform, resulting in the drawback that the N/S ratio becomes worse, making it impossible to provide a satisfactory amplification.

As an alternative method, as shown in FIG. 5, a variable resistor 11 is inserted in the circuit of the light-sources 1 and 2 so that the voltages on the right and left light-sources may be varied by suitably operating said variable resistor 11. This system, however, requires an electric circuit for changing the light-source voltages. Further, in electrically regulating light-quantities, some length of time is required for the light-quantities to become stabilized after the light-source voltages are varied. As a result, the regulating time is prolonged. Further, there are other drawbacks in that the difference in the light-source deterioration rate due to the difference between the right and left light-source voltages has an adverse effect on long-term stability.

These drawbacks are attributable solely to the construction of the light-intermitter of the infrared analyzer. The conventional light-intermitter will now be described with reference to FIGS. 6 and 7.

FIG. 6 shows a light-intermitting mechanism, wherein a motor 12 is fixed to the rear of the light-sources 1 and 2 and has a shaft 14 extending centrally of the light-sources 1 and 2 and downwardly through a speed reducer 13, with an intermittent light-interrupter vane 15 mounted on the front end of said shaft. FIG. 7 shows a light-intermitting mechanism wherein a shaft 17 on which an intermittent light-interrupter vane 15 is mounted is rotated by a motor 12 spaced from the light-sources 1 and 2 and through a belt or gear type speed reducer 16.

In each type of light-intermitting mechanism described above, it is very difficult to freely change the axial distance of the light-sources 1 and 2, since the conventional mechanism comprises a motor 12 at the rear of the light-sources 1 and 2 and a speed reducer consisting of gears, belts or the like. Further, in order to facilitate the displacement of the light-sources 1 and 2, it is necessary to increase the spacing between the light-sources 1 and 2. This, however, presents problems in that the apparatus naturally increases in size and hence it is limited in operation. Further, in the case of the light intermitters shown in FIGS. 6 and 7, if they are of the gear transmission type, there will naturally be a slight play unless gears are precision finished. Further, even if they are precision finished, a slight play will appear with the lapse of time.

If the intermitters are of the power transmission type based on friction resistance such as the belt drive type other than gear transmission means, friction resistance will change due to wear with the lapse of time and slip will occur, causing irregularities in rotation.

Other drawbacks common to the conventional light-intermitters are as follows.

Since the motor has to drive a rotative power transmission device in addition to the intermittent light-interrupter vane, additional torque is required for driving said device. Therefore, it is necessary to use a motor of high power. As a result, the power consumption, of course, increases. Further, in the conventional light-intermitting apparatus, since the high speed rotation of the motor is reduced by a rotative power transmission device to rotate the intermittent light-interrupter vane at a low speed, the bearings except those for the intermittent light-interrupter vane cannot use stone materials such as sapphire for oilless operation purposes. At present, metal materials are used for the bearings except those for the intermittent light-interrupter vane. As a result, frequent lubrication is required. Therefore, the maintainance takes much trouble.

SUMMARY OF THE INVENTION

A principal object of the invention is to adapt the rotor of a motor rotating at a low speed for use as an intermittent light-interrupter vane to permit said rotor to function also as an intermittent light-interrupter vane, thereby to make it unnecessary to use a rotative power transmission device which forms the cause of rotative irregularities and slight play; to make it unnecessary to use superprecision finishing technique in connection with the manufacture of a rotative power transmission device; to reduce the size and weight of the apparatus; to reduce the required power to be developed by the motor; and to achieve absolute oilessness by the use of stone materials for bearings. Another object is to change the distance of light-sources directly from the outside without using a physical shadow or electric means, to provide a change in light-quantity as a result of a change in the distance of light-sources, thereby to effect simple regulation of light-quantities without disturbing a.c. waveforms, particularly to preclude disturbance of detected waveforms, to prevent production of noise and to improve the long-term stability of light-sources.

BRIEF DESCRIPTION OF THE DRAWINGS

FIG. 1 is an explanatory view of a general double light-path type infrared analyzer;

FIG. 2 is an explanatory view of the pressure response characteristics of an ideal capacitor microphone type detector;

FIG. 3 is an explanatory view showing a conventional method of regulating light-quantity by making use of a physical shadow;

FIG. 4 is an explanatory view showing the relation between pressure waveform and signal according to the method shown in FIG. 3;

FIG. 5 is an explanatory view showing a conventional method of electrically regulating light-quantity; and FIGS. 6 and 7 are explanatory views of conventional optical apparatuses.

FIGS. 8 through 11 are views showing a preferred embodiment of the present invention, that is;

FIG. 8 is a longitudinal section of an entire optical apparatus according to the invention;

FIG. 9 is a perspective view of a light-intermitting device;

FIG. 10 is a longitudinal section of the light-intermitting device;

FIG. 11 is an enlarged sectional view of a light-quantity regulating mechanism.

FIGS. 12 and 13 show another embodiment of the light-quantity regulating mechanism, wherein FIG. 12 is a plan view and FIG. 13 is a section taken along the line XIII—XIII of FIG. 12.

DESCRIPTION OF THE PREFERRED EMBODIMENTS

Figure 12:
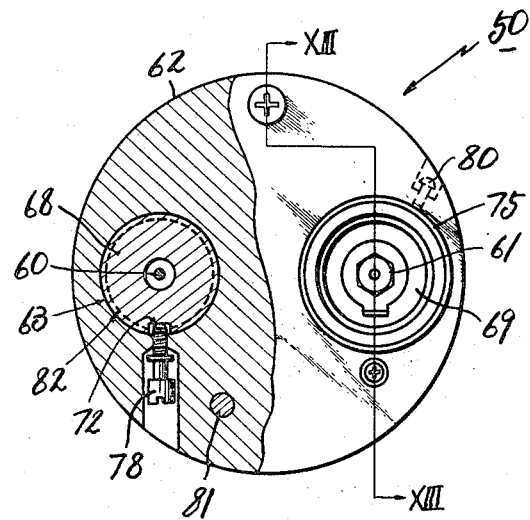

The optical apparatus shown in FIG. 8 comprises a detecting section 20, a cell receiving section 30, a light-intermitting section 40, and a light-source section 50 comprising means for projecting light along two paths.

The cell receiving section 30 is positioned across said light paths downstream of said light intermitting section and parallelly receives a cell 31 for receiving a sample gas and a cell 32 for receiving a reference gas.

The detecting section 20 has two detectors 21 and 22 corresponding to said two cells 31 and 32, respectively positioned to detect the light passed to them along said respective paths. The difference between the outputs from the two detectors 21 and 22 is detected by a capacitor microphone 24 and the detected output difference is amplified by an amplifier 23 to produce a signal.

The light-intermitting device 40, as shown in FIGS. 9 and 10, comprises a hollow round i.e., cylindrical casing 41 of non-magnetic material, a rotor 42 rotatably mounted axially in the casing 41, a coil 43 mounted on the inner peripheral surface of the casing 41 so as to correspond to the outer periphery of the rotor 42, and magnetic poles 44. The opposite end plates of said casing are provided with a desired number of openings 45 corresponding to the two cells 31 and 32. Further, the rotor 42 is made of a magnetic material in the form of a cylinder having a central thin plate-like portion 46 provided with an opening or window 47 serving as a clear portion for intermitting light. The rotative shaft 70 of the rotor 42 is supported by bearings 48 of stone material such as sapphire. The coil 43 is mounted within a coil frame body 49. The light-intermitting device 40 forms an induced revolving field by means of the rotor 42, magnetic poles 44 and coil 48 and rotates the rotor 42 with the period of the revolving field to rotate at a desired speed an intermittent light-interrupter vane section serving also as the rotor 42, i.e. the central thin plate-like portion 46. Further, the revolving field may be of other types than the one illustrated, such as the shading coil type, hysteresis type, capacitor drive type, and inductance drive type.

As described above, since the light-intermitting device 40 of the present invention makes it unnecessary to use a rotative power transmission device and particularly it eliminates friction and gear transmissions, it is possible to eliminate the rotative irregularlities and vibrations of the intermittent light-interrupter vane incidental to wear in a very simple manner. Further, since the use of a rotative transmission device is eliminated, it is easy to reduce the size and weight and reduce costs. Further, it is also possible to employ a motor of low power and reduce electric power consumption. Further, since the rotative parts are formed of sapphire or the like, absolute oilessness can be achieved, so that service and maintainance become easy. Further, since the rotor itself serves also as an intermittent light-interrupter vane, the light-intermitting device can be formed as a unit and assembled between the light-source section and cell receiving section of the optical system in a simple manner, so that handling becomes very easy.

The light-source section 50, as shown in FIG. 11, comprises two light-sources 51 and 52 slidably fitted in a holder 53 correspondingly to said two cells 31 and 32. These two light-sources can be displaced in the direction of the optical axis by a mechanism to be presently described, which is adapted to move the light-sources from the outside in the direction of the optical axis.

Thus, light-quantity regulating bolts 54 and 55 have their front ends rotatably mounted in and connected to the rear of the members holding the light sources 51 and 52 and are screwed in a bolt receiving metal fixtures 56 and 57 fixed to a holder 53. The light-sources 51 and 52 are set in position by set screws 58 and 59 provided in the holder 53.

The rear ends of the light-quantity regulating bolts 54 and 55 are screwed in the bolt receiving metal fixtures 56 and 57, and by turning the light-quantity regulating bolts 54 and 55 clockwise or counterclockwise, the light-sources 51 and 52 can be moved axially in the holder 53 with respect to the bolt receiving metal fixtures 56 and 57. Thus, when the quantities of the energies emitted from the light-sources 51 and 52 and reaching the detectors 21 and 22 via the cells 31 and 32, respectively, are unbalanced, the light-sources 51 and 52 may be relatively moved to selected positions in the holder 62 by said regulating bolts 54 and 55 to control the relative quantities of light projected into said light paths so that they may become balanced.

Figure 13:
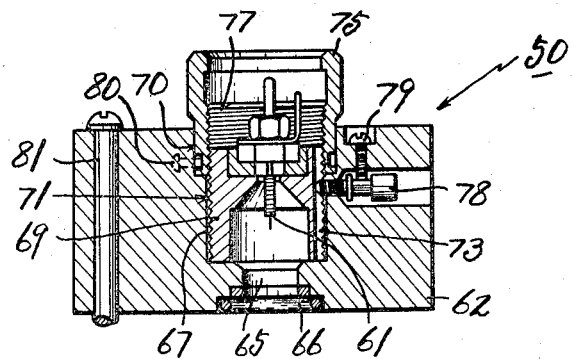

Another embodiment of the light-source section 50 will now be described with reference to FIGS. 12 and 13.

Holes 63 and 64 are provided in two places on a holder 62 for securing two light-sources 60 and 61, i.e., at the areas opposed to two cells 31 and 32. The holes 31 and 32, as shown in FIG. 13, are stepwise provided with different diameters. That is, the innermost region 65 is smallest in diameter and the opening on the side opposed to the cell has a transparent window 66 fitted therein. The diameter of the central region 67 is such that a cylindrical member 68 or 69 may be snugly fitted in it, but the length of said central region is shorter than that of said cylindrical member. The region 70 is greatest in diameter. The light-sources 1 and 2 are centrally mounted in the cylindrical members 68 and 69, respectively. The cylindrical members 68 and 69 are externally formed with screw threads 82 and 71 and longitudinal grooves 72 and 73, respectively. The cylindrical members 68 and 69 can be moved from the outside in the direction of the optical axis by a mechanism to be presently described.

Light-quantity regulating rings 74 and 75 adapted to be fitted in annular clearances defined between the large-diameter portions 70 and cylindrical members 68 and 69, respectively, are internally formed with screw threads 76 and 77 for threaded engagement with the external screw threads 82 and 71 on the cylindrical members 68 and 69, respectively. That is, the light-quantity regulating rings 74 and 75 are threadedly installed in the annular clearances. The numeral 78 denotes a guide pin for the associated cylindrical member, threadedly inserted from the outside, the front end of said guide pin being fitted in the longitudinal groove in the cylindrical supporting member to permit only longitudinal movement thereof. The numeral 79 denotes a set bolt for said guide pin and the numeral 80 denotes a set bolt for the light-quantity regulating ring. With this arrangement, the clockwise or counterclockwise turning of the light-quantity regulating rings will move the cylindrical members in their associated holes in the direction of the optical axis. After the regulation of light-quantities, the light-quantity regulating rings are fixed in position by the set bolts.

As described above, the light-quantity regulating mechanism of the invention can be easily regulated and operated from the outside. Particularly, since the light-quantity regulating mechanism of the invention is adapted to move the light-sources along the light-paths of the optical system to change their distance from the detecting section thereby to change the light-quantities, there will be no possibility of the detected waveform being deformed at the detecting section.

Since the light-intermitting device according to the invention is so constructed that the rotor itself serves also as an intermittent light-interrupter vane, it is no longer necessary to use an exclusive motor for driving an intermittent light-interrupter vane as in the prior art. Therefore, it is possible to affix light-sources directly to the light-intermitting device so as to be exposed to the outside. As a result, it is possible to obtain a light-quantity regulating mechanism which, as described above, can be operated from the outside and can be used in combination with said light-intermitting device. As a result, an optical apparatus which possesses optical regulating function of very high precision can be obtained.

While there have been described herein what are at present considered preferred embodiments of the several features of the invention, it will be obvious to those skilled in the art that modifications and changes may be made without departing from the essence of the invention.

It is therefore to be understood that the examplary embodiments thereof are illustrative and not restrictive of the invention, the scope of which is defined in the appended claims and that all modifications that come within the meaning and range of equivalency of the claims are intended to be included therein.

We claim:

1. Improved optical apparatus for an analyzer, said apparatus being of the type having:
    a. a light source section comprising means for projecting light along two paths and means for controlling the relative quantities of light projected along each path,
    b. a light intermitting section positioned across said light paths and having vane means for intermittently interrupting the passage of the projected light along said paths,
    c. a cell section positioned across said paths downstream of said light intermitting section, said cell section comprising a reference cell and a sample cell interposed in said paths, respectively, and
    d. a detecting section having detectors respectively positioned to detect the light passed by said light intermitting section through said cell section along said respective paths, and said apparatus being improved in that:
    e. said light intermitting section comprises
        1. a hollow cylindrical casing of non-magnetic material,
        2. a cylindrical rotor of magnetic material rotatably mounted in said casing,
        3. a coil installed on the inner peripheral wall surface of said casing so as to correspond to the outer periphery of said rotor and magnetic poles, with
        4. the corresponding plate-like portions of said casing and rotor being provided with windows for intermitting light, the rotor itself being formed as the light intermitting vane means.

2. Improved optical apparatus as claimed in claim 1, said apparatus being further improved in that:
    f. said light source section comprises:
        1. separate light sources for said two paths,
        2. a holder mounting said separate light sources for relative movement axially of said paths,
        3. externally operable means connected to said light sources for relatively moving the same to selected positions to control the relative quantities of light projected along said light paths, and 4. set screw means for locking said separate light sources in such selected positions.

3. Improved optical apparatus as claimed in claim 2, wherein said externally operable means comprises regulating screws projecting from said light sources and threaded means carried by said holder adjustably engaging said regulating screws.

4. Improved optical apparatus as claimed in claim 2, wherein said light sources comprise cylindrical supporting members provided with external screw threads and longitudinally grooves, means engaging said longitudinal grooves to permit only longitudinal movement of said supporting members, and adjustable rings engaged with said holder and threadedly engaging said external screw threads for effecting such longitudinal movement.

\* \* \* \* \*